United States Patent
Monowa et al.

(10) Patent No.: US 6,328,673 B1
(45) Date of Patent: Dec. 11, 2001

(54) CONTROL APPARATUS FOR AN AUTOMATIC TRANSMISSION OF A VEHICLE AND A CONTROL METHOD

(75) Inventors: Toshimichi Monowa, Mito; Tatsuya Ochi, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/815,949

(22) Filed: Mar. 13, 1997

(30) Foreign Application Priority Data

Mar. 13, 1996 (JP) .................................................. 8-055783

(51) Int. Cl.[7] .................................................. F16H 59/48
(52) U.S. Cl. ........................ 477/120; 477/159; 477/904
(58) Field of Search ................................. 477/143, 154, 477/155, 156, 98, 121, 120, 159, 904

(56) References Cited

U.S. PATENT DOCUMENTS

| | | | | |
|---|---|---|---|---|
| 4,722,247 | * | 2/1988 | Shindo et al. .......................... | 477/152 |
| 4,845,618 | * | 7/1989 | Narita ................................. | 477/155 X |
| 4,955,256 | * | 9/1990 | Kashihara et al. ................... | 477/154 X |
| 4,967,356 | * | 10/1990 | Mori ................................... | 477/155 X |
| 5,063,814 | * | 11/1991 | Baba et al. ........................... | 477/154 X |
| 5,079,970 | * | 1/1992 | Butts et al. .......................... | 477/120 X |
| 5,103,694 | * | 4/1992 | Kobayashi et al. ................... | 477/160 X |
| 5,182,969 | * | 2/1993 | Goto et al. ........................... | 477/122 |
| 5,292,288 | * | 3/1994 | Kashiwabara et al. .............. | 477/156 X |
| 5,443,427 | * | 8/1995 | Ataka et al. .......................... | 477/154 X |
| 5,462,499 | * | 10/1995 | Bullmer et al. ...................... | 477/120 |
| 5,468,198 | * | 11/1995 | Holbrook et al. ..................... | 477/143 |
| 5,505,675 | * | 4/1996 | Kuriyama et al. .................... | 477/156 |
| 5,510,982 | * | 4/1996 | Ohnishi et al. ....................... | 477/120 X |
| 5,527,236 | * | 6/1996 | Kimura et al. ....................... | 477/156 X |
| 5,634,869 | * | 6/1997 | Mikami et al. ....................... | 477/154 |
| 5,647,820 | * | 7/1997 | Matsumoto et al. ................ | 477/156 X |
| 5,669,849 | * | 9/1997 | Tabata et al. ........................ | 477/154 X |
| 5,772,555 | * | 6/1998 | Minowa et al. ...................... | 477/156 X |
| 5,795,265 | * | 8/1998 | Domain et al. ...................... | 477/156 X |
| 5,833,573 | * | 11/1998 | Inuzuka et al. ...................... | 477/156 X |
| 5,846,163 | * | 12/1998 | Kimura et al. ....................... | 477/143 X |
| 5,865,708 | * | 2/1999 | Nishio et al. ......................... | 477/155 |
| 5,871,418 | * | 2/1999 | Kimura et al. ....................... | 477/156 X |

FOREIGN PATENT DOCUMENTS

| | | |
|---|---|---|
| 62-167961 | 7/1987 | (JP) . |
| 03-265756 | 11/1991 | (JP) . |
| 07-27217 | 1/1995 | (JP) . |
| 07-71586 | 3/1995 | (JP) . |

* cited by examiner

Primary Examiner—Charles A. Marmor
Assistant Examiner—Ha Ho
(74) Attorney, Agent, or Firm—Crowell & Moring LLP (57) ABSTRACT

A control apparatus and a control method for an automatic transmission, minimizes torque fluctuations which, if left unchecked, give vehicle passengers a disagreeable feeling upon a gear shift. The control apparatus and method suppresses, such torque fluctuations during a shift of the transmission to improve robustness and provide good shift characteristics. An inertia phase is recognized in which the engine speed starts to drop during the shift. At the beginning of the inertia phase, hydraulic pressures supplied to frictional engaging devices in the transmission are kept constant to suppress the torque fluctuations.

4 Claims, 11 Drawing Sheets

CONTROL APPARATUS FOR AN AUTOMATIC TRANSMISSION OF A VEHICLE AND A CONTROL METHOD

BACKGROUND AND SUMMARY OF THE INVENTION

This application claims the priority of 8-055783, the disclosure of which is expressly incorporated by reference herein.

The present invention relates to a control apparatus for an automatic transmission of a vehicle and a control method for that transmission. More particularly, the invention relates to an apparatus and a method for controlling hydraulic pressure in operating an automatic transmission of a vehicle.

A known control method of the kind outlined above typically involves keeping an engaging pressure of an engaging-side frictional engaging device constant until a torque phase is approximately started for a shift-up operation, the engaging pressure getting thereafter increased for the shift, as disclosed illustratively in Japanese Patent Laid-Open No. Hei 7-27217. The torque phase refers to a period in which torque alone is varied while the engine speed remains unchanged at the start of a shift from second to third, as indicated by temporal changes of a Gf signal (to be defined later) in a timing chart of FIG. 2 of this specification. The torque phase is followed by a period called an inertia phase in which the clutch inside the transmission starts to be engaged and the engine speed drops accordingly.

There is a problem with the conventional control method such as the one disclosed in Japanese Patent Laid-Open No. Hei 7-27217. As the engaging pressure of the engaging-side frictional engaging device is being raised at shift-up time from the beginning of a torque phase, torque fluctuations are increased in the first half of the subsequent inertia phase, which makes it impossible to acquire good shift characteristics. Another problem is that during feedback control of the engaging pressure from the beginning of the torque phase, large torque fluctuations at the first half of the inertia phase tend to lower robustness (i.e., stability of the control system).

It is therefore an object of the present invention to provide an automatic transmission control apparatus and method whereby torque fluctuations in the first half of an inertia phase are placed under feed-forward control to enhance robustness in subsequent feedback control so that an improved repeatable shift characteristic is obtained.

The foregoing object may be achieved according to one aspect of the present invention, which provides an automatic transmission control method and apparatus comprising two frictional engaging devices in an automatic transmission connected to an engine, and pressure control command generation apparatus. One of the frictional engaging devices is engaged and the other device disengaged for a shift. The pressure control command generation apparatus controls hydraulic pressures supplied to the two frictional engaging devices during the shift and varies pressure control characteristics of the devices accordingly. The automatic transmission control apparatus further comprises: inertia phase recognition apparatus for recognizing an inertia phase during a shift; torque fluctuation suppression apparatus for calculating pressure control command values to keep to predetermined levels the hydraulic pressures supplied to the frictional engaging devices at the beginning of the inertia phase thus recognized; and pressure control command value output apparatus for outputting to the pressure control command generation apparatus the pressure control command values calculated by the torque fluctuation suppression apparatus.

Other objects and further features of the invention will be apparent from the following detailed description when read in conjunction with the accompanying drawings.

DETAILED DESCRIPTION OF THE PREFERRED EMBODIMENTS

Figure 1:
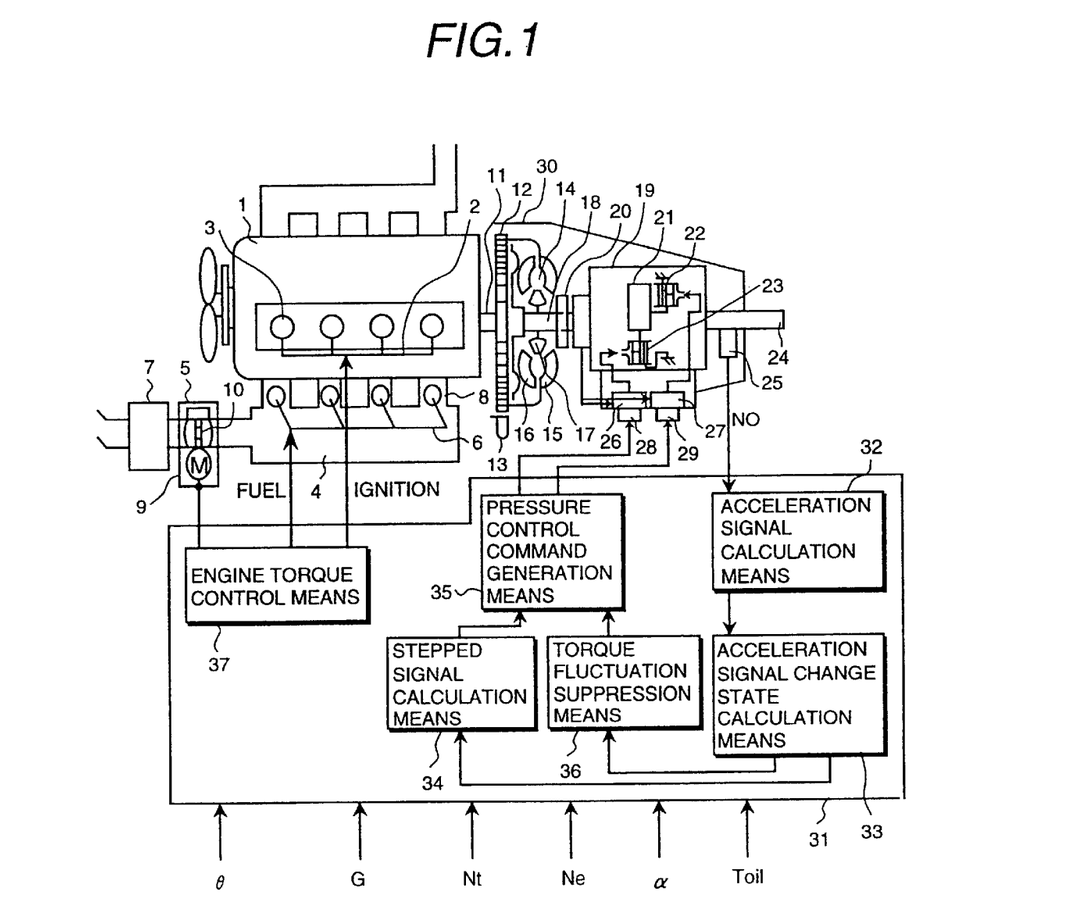
FIG. 1 is a system block diagram of an automatic transmission control apparatus practiced as an embodiment of the invention.

FIG. 1 outlines an automatic transmission control apparatus practiced as an embodiment of the invention. In FIG. 1, an engine 1 is a four-cylinder engine equipped with an ignition device 2. The ignition device 2 has four ignitors 3 corresponding to the four cylinders of the engine 1. An intake pipe 4 for taking air into the engine 1 has an electronically controlled throttle 5, a fuel injection device 6 for injecting fuel into the engine 1, and an air flow meter 7. The fuel injection device 6 has four injectors 8 corresponding to the four cylinders of the engine 1. The electronically controlled throttle 5 causes an actuator 9 to drive a throttle valve 10 for air flow control. In a typical vehicle, the throttle valve 10 is connected to an accelerator pedal (not shown) by a mechanical wire (not shown), the two components being operated in an interlocked manner.

A crank shaft 11 of the engine 1 is furnished with a flywheel 12. The flywheel 12 has an engine speed sensor 13 that detects revolutions of the crank shaft 12, i.e, an engine speed Ne. A torque converter 14 coupled directly to the flywheel 12 is composed of a pump 15, a turbine 16 and a stator 17. A torque converter output shaft 18, i.e., the output shaft of the turbine 16, is coupled directly to a stepped transmission 19. The torque converter output shaft 18 is equipped with a turbine speed sensor 20 for measuring a turbine speed Nt. The transmission 19 comprises a planetary gear 21 and frictional engaging devices 22 and 23. The devices 22 and 23 are engaged and disengaged so as to vary the gear ratio of the gear 21 for the shift required. The devices 22 and 23 are controlled respectively by spool valves 26 and 27 and linear solenoids 28 and 29 (pressure governors). The transmission 19 is coupled to an output shaft 24 and has a transmission output shaft speed sensor 25 (the so-called vehicle speed sensor) that detects revolutions of the shaft 24. These components constitute an automatic transmission 30.

A controller 31 controls actuators for driving the engine 1 and automatic transmission 30. The controller 31 receives such parameters as throttle valve opening $\theta$, turbine speed Nt, engine speed Ne, transmission output shaft speed No, transmission oil temperature Toil, accelerator pedal angle $\alpha$, and acceleration sensor signal G for control purposes. In a specialized system, a torque sensor (not shown) attached to the transmission output shaft 24 detects a transmission output shaft torque To and supplies a signal representing the detected torque to the controller 31. The torque signal, having a waveform similar to that of the acceleration sensor signal, may be used to control the frictional engaging devices of the invention. Engine torque control apparatus 37 in the controller 31 outputs control signals to the electronically controlled throttle 5, to the fuel injection device 6 and to the ignition device 2. These control signals are also used to suppress torque fluctuations during the shift.

Illustratively, acceleration signal calculation apparatus 32 in the controller 31 calculates longitudinal acceleration of the vehicle by dividing the difference between the transmission output shaft speed No of the current calculation period on the one hand, and the transmission output shaft speed No of the preceding calculation period on the other hand, by a calculation period. Because the longitudinal acceleration of the vehicle is characteristically similar to the torque of the transmission output shaft, the calculated longitudinal acceleration allows a torque phase and an inertia phase to be grasped upon a shift. That is, the state of a shift can be recognized. An alternative way to grasp the torque phase and inertia phase is by directly detecting the longitudinal acceleration of the vehicle using an acceleration sensor. Another way is to sense the transmission output shaft torque by use of a torque sensor. If the inertia phase alone needs to be detected, the input-output shaft speed ratio of the transmission (i.e., speed ratio) may be resorted to for detection. For shift-up control, acceleration signal change state calculation apparatus 33 stores an acceleration signal in effect upon generation of a shift command signal, i.e., in effect before a shift operation, and checks to see if a torque phase is reached based on the change state represented by the signal. If a torque phase is found to be reached, stepped signal calculation apparatus 34 calculates a pressure control command value for rapidly lowering the hydraulic pressure supplied to the disengaging-side frictional engaging device 22. For shift-down control, the acceleration signal change state calculation apparatus 33 stores an acceleration signal in effect before a shift command signal is generated, i.e., in effect before the throttle valve opening is increased. This acceleration signal, combined with the generated shift command signal, is used to find the state of change from the acceleration signal in effect before the increase of the throttle valve opening. On the basis of the state of change thus acquired, a check is made to see if the start of a shift operation (i.e., beginning of an inertia phase) is approached. If the start of a shift operation is found to be imminent, the stepped signal calculation apparatus 34 calculates a pressure control command value for rapidly raising the hydraulic pressure fed to the engaging-side frictional engaging device 22. Pressure control command generation apparatus 35 outputs the pressure control command value thus calculated to the linear solenoid 29.

For shift-up control, the acceleration signal change state calculation apparatus 33 detects an inertia phase based on the changes in the above acceleration signal, to see if the inertia phase is in its first or latter half. When the inertia phase is found to be in its first half, torque fluctuation suppression apparatus 36 calculates a constant pressure control command value to keep constant, with respect to the preceding torque phase, the hydraulic pressure supplied to the engaging-side frictional engaging device 22. For shift-down control, the acceleration signal change state calculation apparatus 33 detects an inertia phase based on the changes in the above acceleration signal, to see if the inertia phase is in its first or latter half. When the inertia phase is found to be in its first half, the torque fluctuation suppression apparatus 36 calculates a constant pressure control command value to keep constant, with respect to the preceding torque phase, the hydraulic pressure supplied to the disengaging-side frictional engaging device 23. Thereafter, the appropriate pressure control command value is calculated to raise or lower the hydraulic pressure fed to the frictional engaging device 22 or 23 for the shift-up or shift-down operation. Alternatively, feedback hydraulic pressure control may be instituted by use of an acceleration signal.

Figure 2:
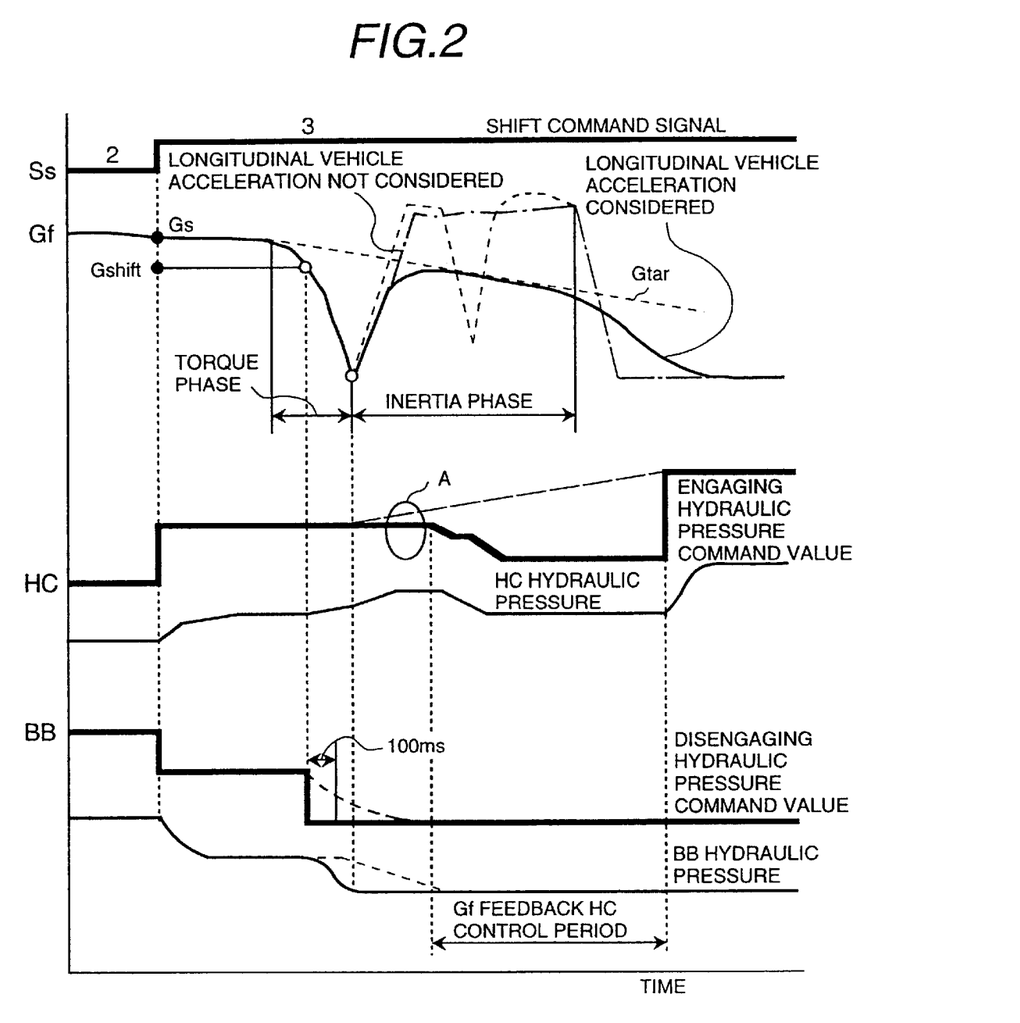
FIG. 2 is a timing chart of the embodiment in effect during shift-up control.
Figure 4:
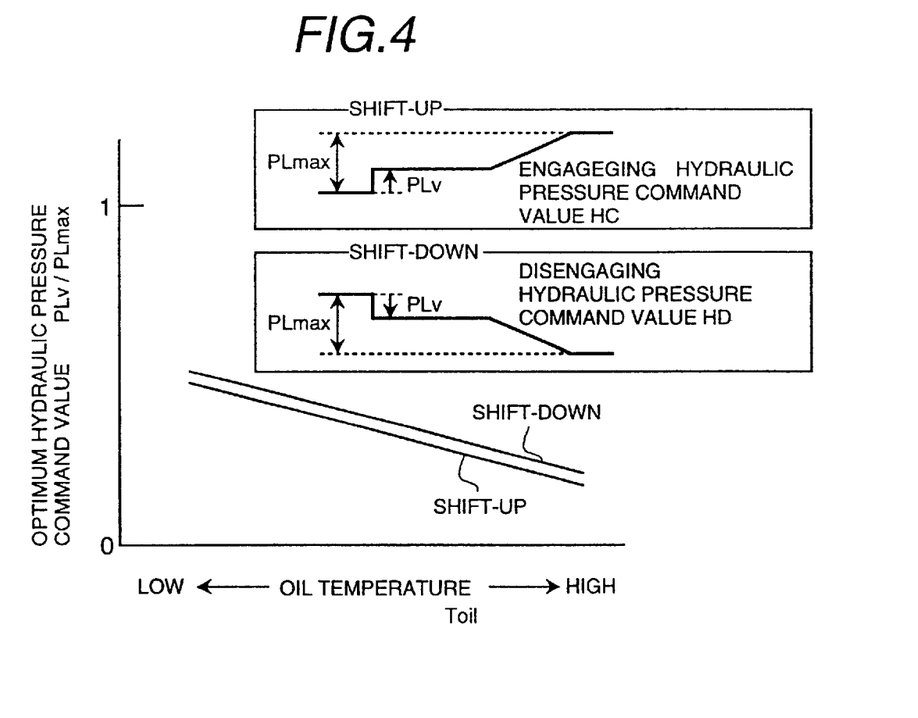
FIG. 4 is a graphic representation plotting optimum hydraulic pressure command values PLv/PLmax in effect when an oil temperature Toil is varied.
Figure 5:
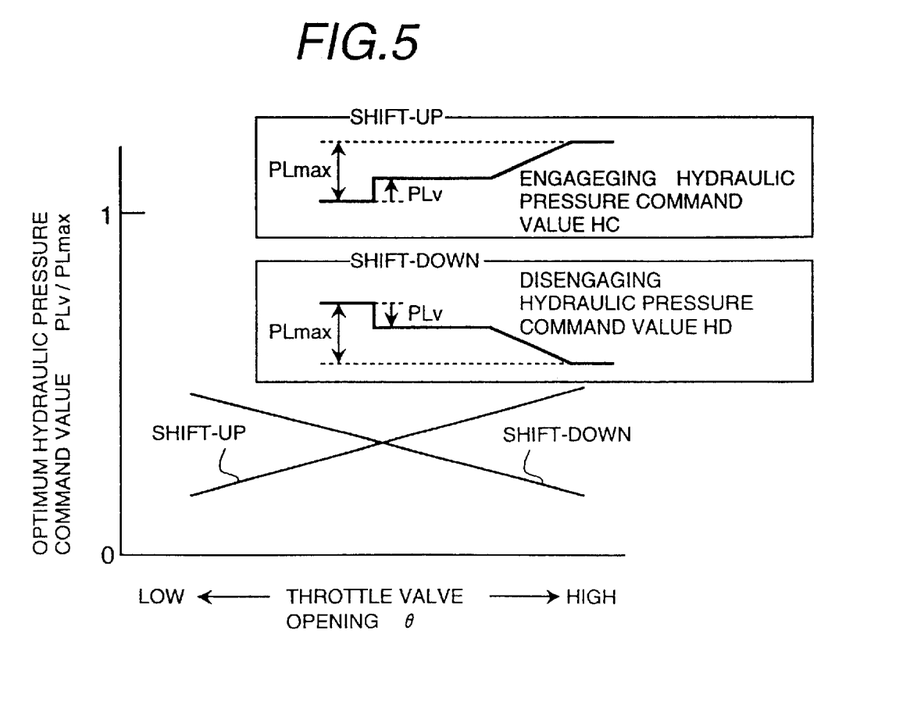
FIG. 5 is a graphic representation plotting the optimum hydraulic pressure command values PLv/PLmax in effect when a throttle valve opening θ is varied.

FIG. 2 is a timing chart of the embodiment in effect during shift-up control, illustratively for a shift from second to third. In FIG. 2, solid lines represent control characteristics of the embodiment. When a shift command signal designates a shift from second to third, an acceleration signal Gf, i.e., a longitudinal vehicle acceleration signal having been filtered, is stored as an acceleration signal Gs in effect before the shift. A change constant for the acceleration signal Gf by which to recognize the beginning of a torque phase is set as an acceleration Gshift. In view of ensuring the precision of torque phase recognition, the acceleration Gshift needs to be varied depending on the changes in the throttle valve opening $\theta$, i.e., on the magnitude of engine load. An engaging hydraulic pressure command signal HC is raised simultaneously with the setting of the change constant. The value of the signal HC to rise is determined in advance by a matching process. The engaging hydraulic pressure command signal HC needs to be varied in value depending on the changes in the transmission oil temperature Toil and throttle valve opening $\theta$. Such variations are stored beforehand in data tables as shown in FIGS. 4 and 5. A disengaging hydraulic pressure command signal BB is made to fall as shown in FIG. 2. The value of the signal BB to fall should be set beforehand to establish, when the signal is made to fall, a hydraulic pressure bordering on disengagement in order to advance the disengagement time of the disengaging-side frictional engaging device. The signal BB also needs to be varied in value depending on the changes in the transmission oil temperature Toil and throttle valve opening $\theta$.

When the torque phase begins, the disengaging hydraulic pressure command signal BB is made to fall in stepped fashion to disengage the disengaging-side frictional engaging device at a point in time marked by a small hollow circle on the plotted characteristic of the acceleration Gf. The acceleration Gf in effect at this point is regarded as an acceleration Gshift. In this manner, getting the disengaging hydraulic pressure command signal BB to fall allows the actual disengaging hydraulic pressure to synchronize with a point in time marked by another hollow circle at the end of the torque phase. The operation provides an improved shift characteristic. For the present system, the fall time of the stepped signal BB is kept from exceeding 100 ms in view of hydraulic responsiveness. Letting the signal fall time exceed 100 ms will produce vibrations in the acceleration Gf in the inertia phase as indicated by broken lines in FIG. 2. Such vibrations are attributable to a delayed disengagement of the disengaging-side frictional engaging device.

With the inertia phase started, the engaging hydraulic pressure command signal HC derived from the torque phase needs to be kept constant in value (see part A in FIG. 2) so that the acceleration Gf will coincide with a target acceleration Gtar (i.e., target acceleration signal). Where the longitudinal acceleration of the vehicle is not considered, raising the engaging hydraulic pressure command signal HC in value illustratively from the beginning of the inertia phase boosts the acceleration Gf to a level appreciably higher than the target acceleration Gtar. This produces torque fluctuations indicated by dashed lines in FIG. 2. In the latter half of the inertia phase, the value of the engaging hydraulic pressure command signal HC needs to be controlled by feedback of the acceleration Gf in order to suppress torque fluctuations.

Figure 3:
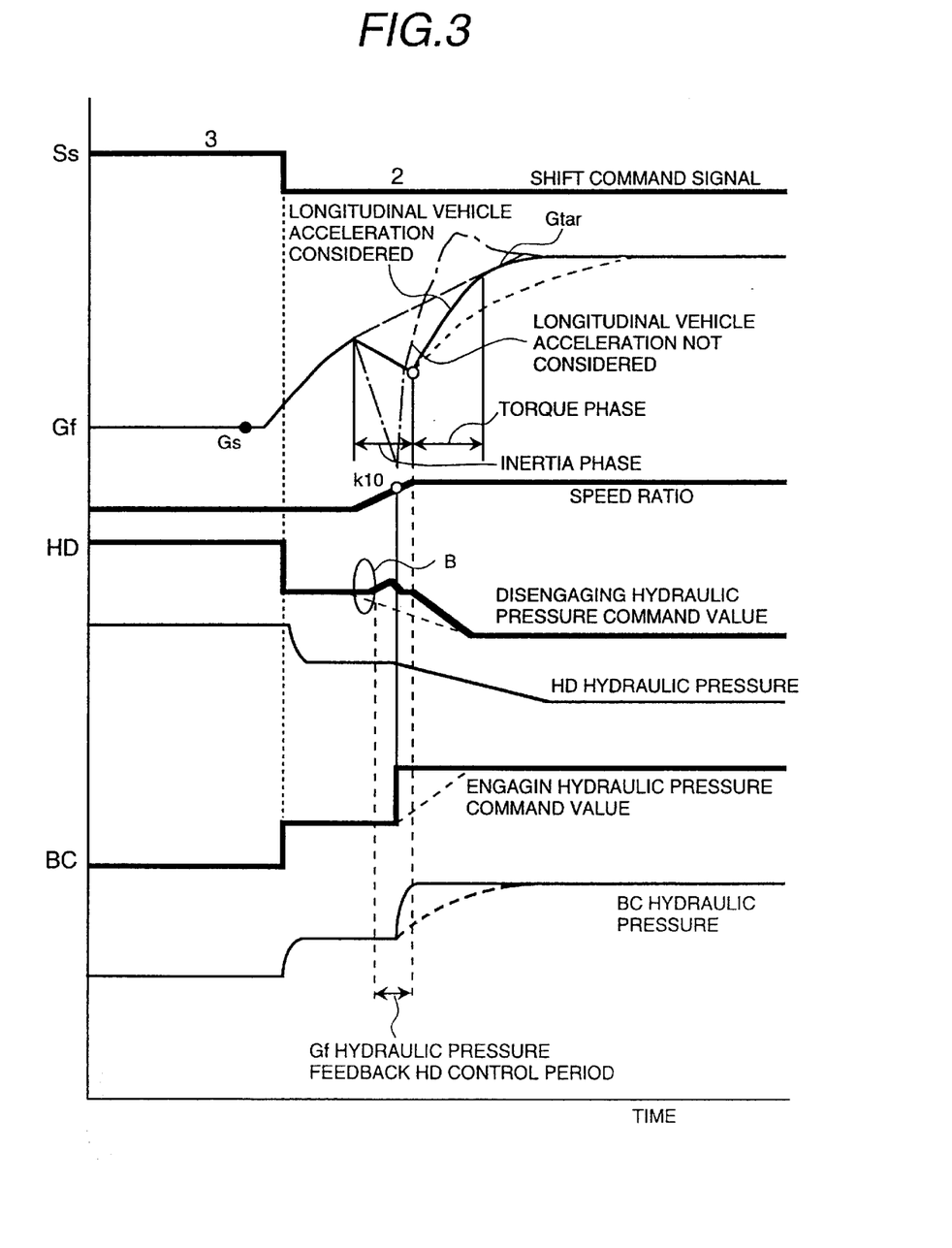
FIG. 3 is a timing chart of the embodiment in effect during shift-down control.

FIG. 3 is a timing chart of the embodiment in effect during shift-down control, illustratively for a shift from third to second. In FIG. 3, solid lines represent control characteristics of the embodiment. Before a shift command signal designates a shift from third to second, the acceleration Gf is regarded and stored as an acceleration signal Gs. A check is then made to see if the shift command signal is generated. If the signal is found to be generated, a disengaging hydraulic pressure command signal HD is made to fall. The value of the signal HD to fall is determined in advance by a matching process. The disengaging hydraulic pressure command signal HD needs to be varied in value depending on the changes in the oil temperature Toil and throttle valve opening θ. Such variations are stored beforehand in data tables as shown in FIGS. 4 and 5. To detect the engine load more precisely requires using the acceleration signal Gs mentioned above. An engaging hydraulic pressure command signal BC is raised simultaneously with the generation of the acceleration command signal. The value of the command signal BC to rise should be set beforehand to establish, when the signal is raised, a hydraulic pressure bordering on disengagement in order to advance the engagement time of the engaging-side frictional engaging device. The signal BC also needs to be varied in value depending on the changes in the transmission oil temperature Toil and throttle valve opening θ.

To minimize the rate of decrease in the acceleration Gf after the inertia phase has started requires keeping the disengaging hydraulic pressure command signal HD to a constant value in the inertia phase (see part B in FIG. 3). Where the longitudinal acceleration of the vehicle is not considered, lowering the disengaging hydraulic pressure command signal HD in value illustratively from the beginning of the inertia phase quickly reduces the acceleration Gf to a level appreciably lower than the target acceleration Gtar, as indicated by dashed lines in FIG. 3. From the latter half of the inertia phase to the beginning of a torque phase, the value of the disengaging hydraulic pressure command signal HD needs to be controlled by feedback of the acceleration Gf in order to suppress torque fluctuations.

In the latter half of the inertia phase, the engaging hydraulic pressure command signal BC is made to rise in stepped fashion to engage the engaging-side frictional engaging device 23 at a point in time marked by a small hollow circle on the plotted speed ratio characteristic. A speed ratio value k10 at the hollow circle is obtained through matching in consideration of hydraulic responsiveness. This allows the actual engaging hydraulic pressure to synchronize with a point in time marked by another hollow circle at the beginning of the torque phase. The operation provides a good shift characteristic. If the stepped signal of the engaging hydraulic pressure command value BC is delayed as indicated by broken line in FIG. 3, the engagement of the frictional engaging device 23 fails to coincide with the start of the torque phase. The delay in the engagement of the frictional engaging device 23 adversely affects the rise in acceleration in the torque phase. As a result, the driver's feel of acceleration during a shift-down worsens.

FIG. 4 graphically plots optimum hydraulic pressure command values PLv/PLmax in effect when the oil temperature Toil is varied. In FIG. 4, a solid and a braided line represent tendencies for shift-up and shift-down control respectively. The optimum hydraulic pressure command value PLv/PLmax is defined as the rate of increase in the engaging hydraulic pressure command value HC for shift-up control, and as the rate of decrease in the engaging hydraulic pressure command value HC for shift-down control. For both shift-up and shift-down control, the optimum command value drops as the oil temperature Toil rises. It is known that the lower the oil temperature Toil, the greater the viscosity of the oil in the transmission. Thus to supply the frictional engaging device with a constant hydraulic pressure requires setting a larger hydraulic pressure command value the lower the oil temperature Toil. The command values for shift-up control differ from those for shift-down control. This is because, with the oil temperature Toil held constant, the engaging and disengaging hydraulic pressures for the frictional engaging devices come on their minimum hydraulic pressure side.

FIG. 5 graphically plots the optimum hydraulic pressure command values PLv/PLmax in effect when the throttle valve opening θ is varied. In FIG. 5, a solid and a braided lie represent tendencies for shift-up and shift-down control respectively. The definition of the optimum hydraulic pressure command value PLv/PLmax is the same as in the case of FIG. 4. For shift-up control, the command value tends to rise as the throttle valve opening θ is increased. That is, when the engine load is getting higher, the force being applied to a frictional engaging device reaches a point where the device begins to slip. To prevent the slippage requires correcting the hydraulic pressure command values as shown in FIG. 5. For shift-down control, when the engine load is increased progressively, the frictional engaging device does not slip gradually but is immediately disengaged. In this case, a shortened shift time lets the engine speed rise abruptly, causing a drop in the inertia torque. This is the point where, with the throttle valve opening θ increased, the hydraulic pressure command value needs to be corrected downward.

Figure 6:
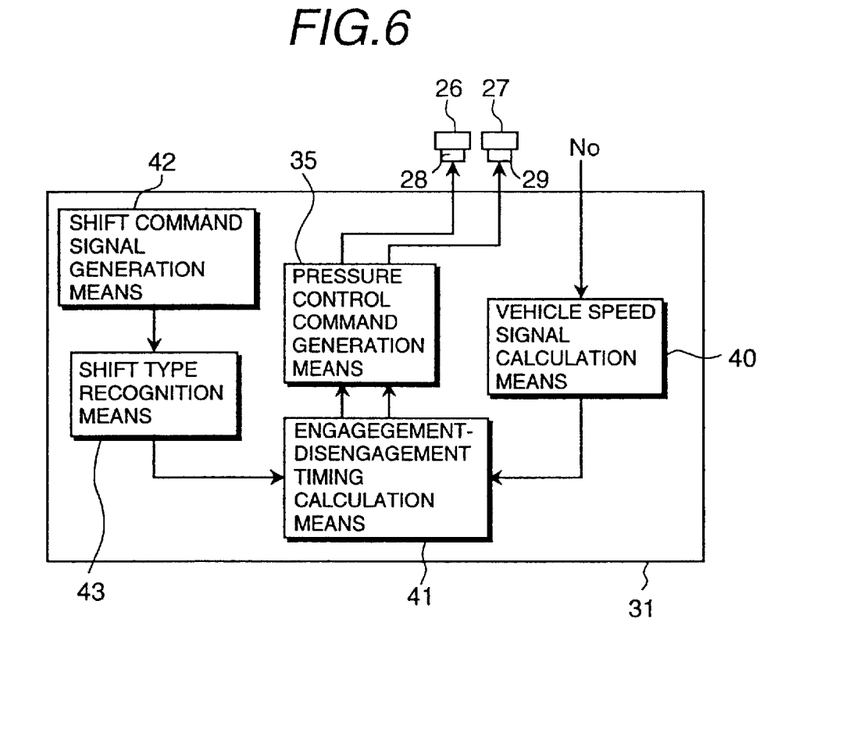
FIG. 6 is a block diagram outlining engagement-disengagement timing control blocks that operate using a vehicle speed signal.
Figure 8:
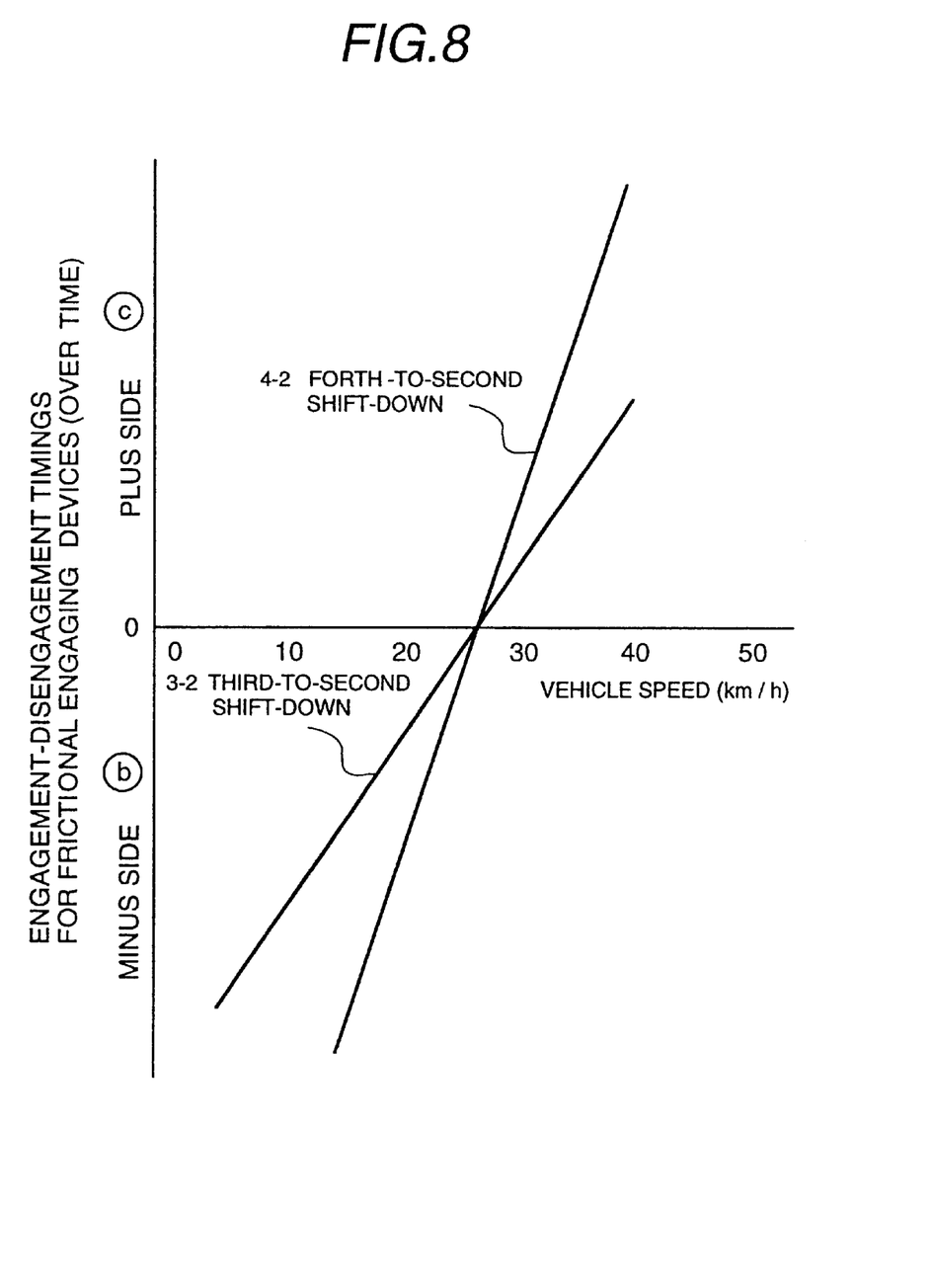
FIG. 8 is a graphic representation of relations between a vehicle speed and engagement-disengagement timings of frictional engaging devices.

FIG. 6 outlines the engagement-disengagement timing control blocks of the embodiment operating by use of the vehicle speed signal. The transmission output shaft speed No input to the controller 31 is converted to a vehicle speed signal by vehicle speed signal calculation apparatus 40. Engagement-disengagement timing calculation apparatus 41 calculates pressure control command values for obtaining engagement-disengagement timings of the frictional engaging devices by use of the relations between the vehicle speed signal and those engagement-disengagement timings. The pressure control command values thus calculated are output to the linear solenoids 28 and 29 by the pressure control command generation apparatus 35. As shown in FIG. 8 (to be explained later), the above relations vary with shift type. Thus pressure control command generation apparatus 42 and shift type recognition apparatus 43 need to be used to input the recognized shift type (third-to-first shift, third-to-second shift, etc.) to the calculation apparatus 41, whereby different characteristics of different shifts are calculated. The result is obtained alternatively where the vehicle speed signal derived from the transmission output shaft speed is replaced by a transmission input shaft speed and the speed ratio.

Figure 7:
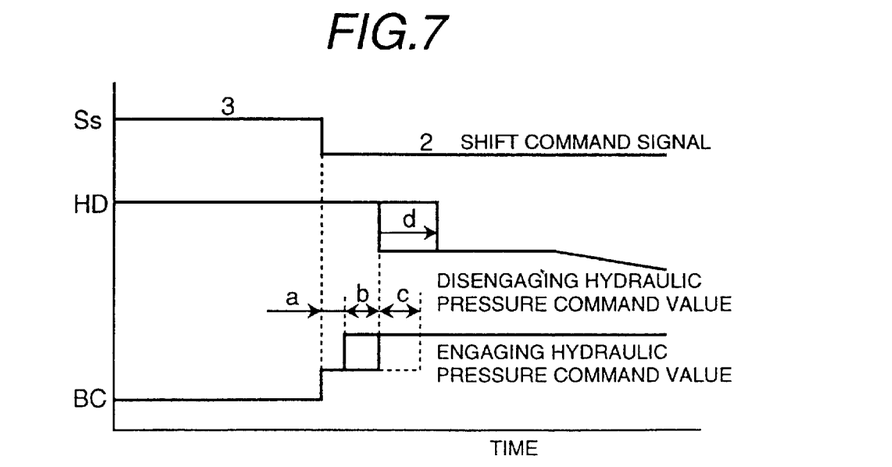
FIG. 7 is a timing chart showing engagement-disengagement timings in effect during shift-down control.

FIG. 7 is a timing chart showing engagement-disengagement timings in effect during shift-down control. Illustratively, when a shift command signal Ss designates a shift from third to second, it is necessary to cause the disengaging hydraulic pressure command signal HD to fall in preparation for a disengagement and cause the engaging hydraulic pressure command signal BC to rise to prepare for an engagement. The timings for starting a rise and a fall of the signals are determined in reference to a point in time at which the disengaging hydraulic pressure command signal HD falls. In FIG. 7, reference character b indicates a case where the engaging hydraulic pressure command signal BC is raised earlier than the point in time for the disengaging hydraulic pressure command signal HD (shown by solid line) to fall. Reference character c represents a case in which the engaging hydraulic pressure command signal BC is raised later than the point in time for the disengaging hydraulic pressure command signal HD to fall. Where the shift type is different, the timing for the disengaging hydraulic pressure command signal HD to fall is delayed by a period of d. A period of a is the time required for the engaging-side frictional engaging device to attain a hydraulic pressure bordering on engagement.

FIG. 8 graphically depicts typical relations between the vehicle speed and engagement-disengagement timings of the frictional engaging devices. The engagement-disengagement timings are found to be expressed in an approximately linear fashion relative to the vehicle speed on the axis of abscissa. The plus and minus sides in FIG. 8 correspond respectively to the periods a and b in FIG. 7. FIG. 8 shows characteristics of a third-to-second shift and a fourth-to-second shift. The reason for the characteristics to vary with the shift type is attributed to the width of speed ratio. For example, a fourth-to-second shift involves a greater width of speed ratio leading to larger inertia torque fluctuations. This requires prolonging the timings for engagement and disengagement with respect to the same vehicle speed so that the shift will take longer to be accomplished.

Figure 9:
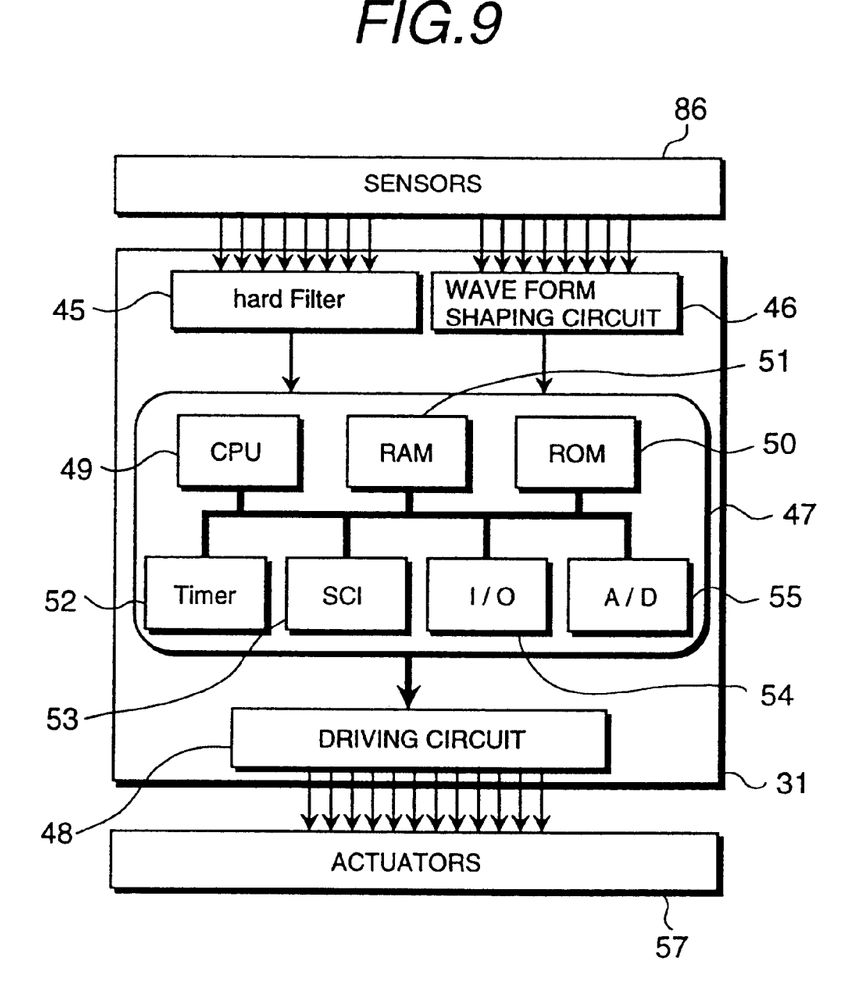
FIG. 9 is a hardware block diagram of a controller in the embodiment.

FIG. 9 is a hardware block diagram of the controller 31. As shown in FIG. 9, the controller 31 is made up of a filter 45 along with a waveform shaping circuit 46 for receiving signals from various sensors 56, of a single-chip microcomputer 47, and of a driving circuit 48 for outputting driving control signals to actuators 57 such as valves. The microcomputer 47 includes a CPU (central processing unit) 49 for carrying out various operations, a ROM (read-only memory) 50 for storing programs and data to be executed by the CPU 49, a RAM (random access memory) 51 for temporarily accommodating various data, a timer 52, an SCI (serial communication interface) circuit 53, an I/O (input-output) circuit 54, and an A/D (analog-to-digital) converter 55. The functions of the controller 31 are accomplished by the CPU 49 carrying out appropriate operations based on the programs and data held in the ROM 50 and RAM 51.

The above-described single-chip hardware configuration of the controller 31 may be replaced alternatively with a plurality of single-chip microcomputers communicating via a dual-port RAM arrangement. Another alternative is to have a plurality of single-chip microcomputers communicating over a LAN (local area network).

Figure 10:
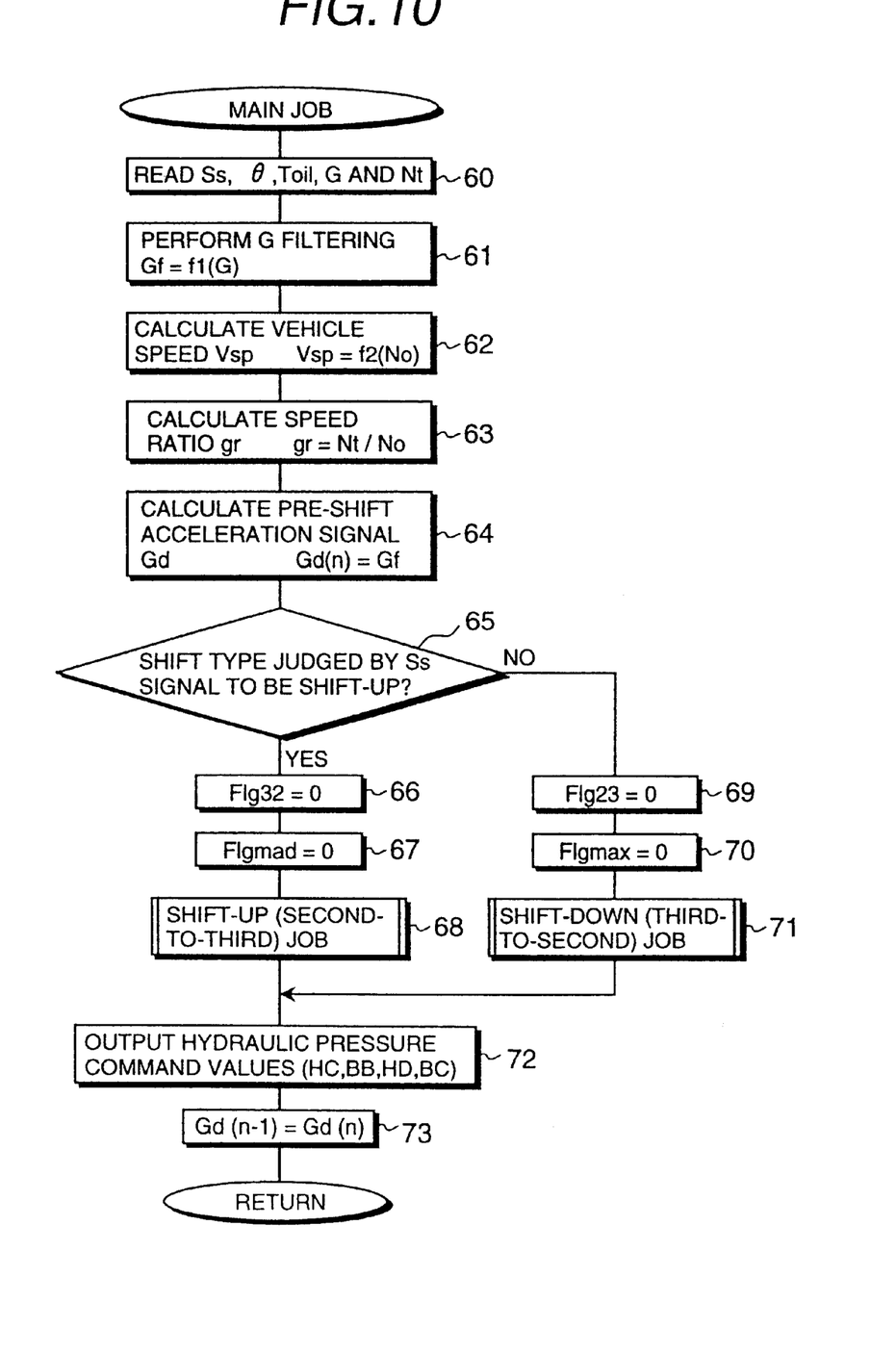
FIG. 10 is a flowchart of main control of the embodiment.
Figure 11:
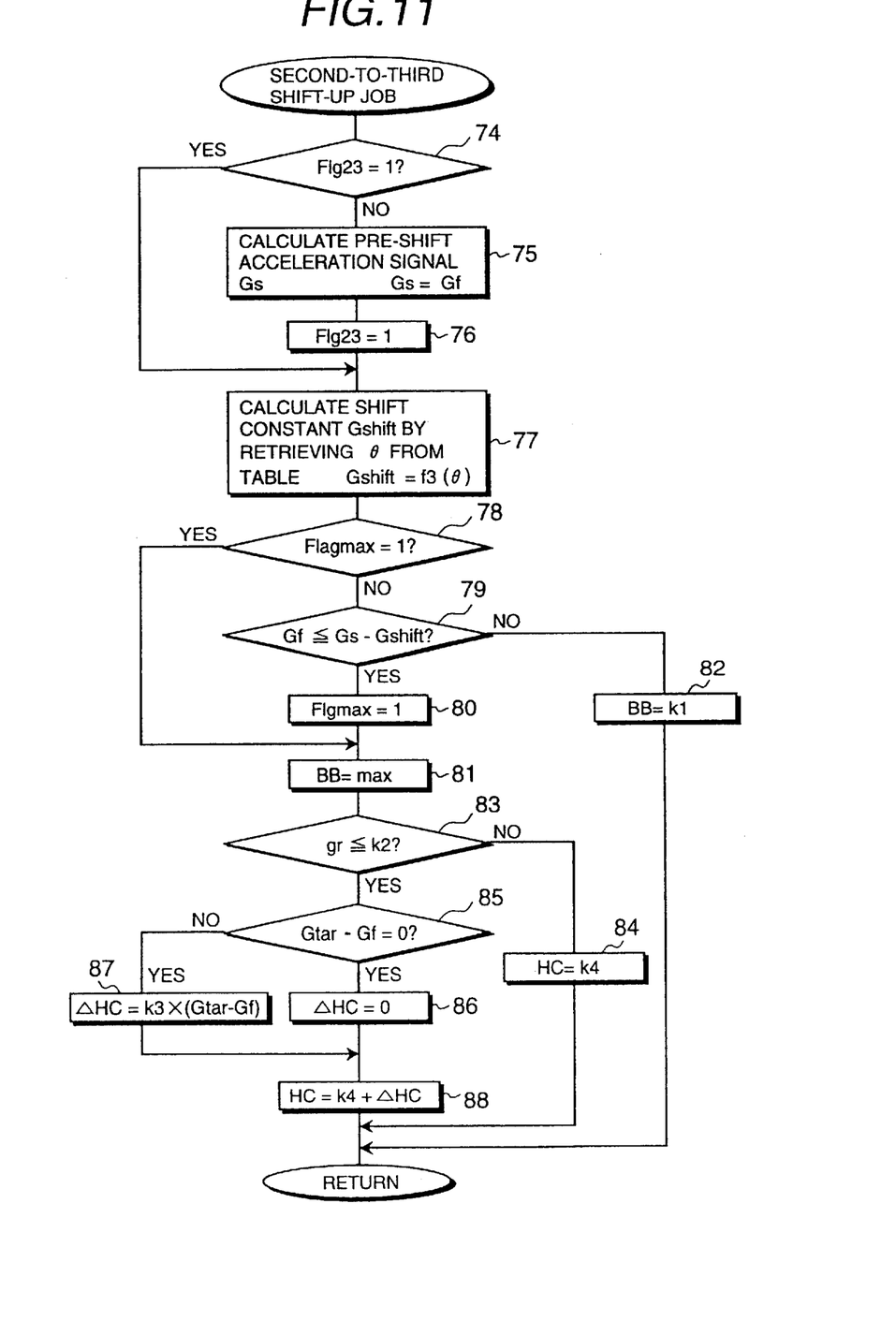
FIG. 11 is a flowchart of shift-up control of the embodiment.
Figure 12:
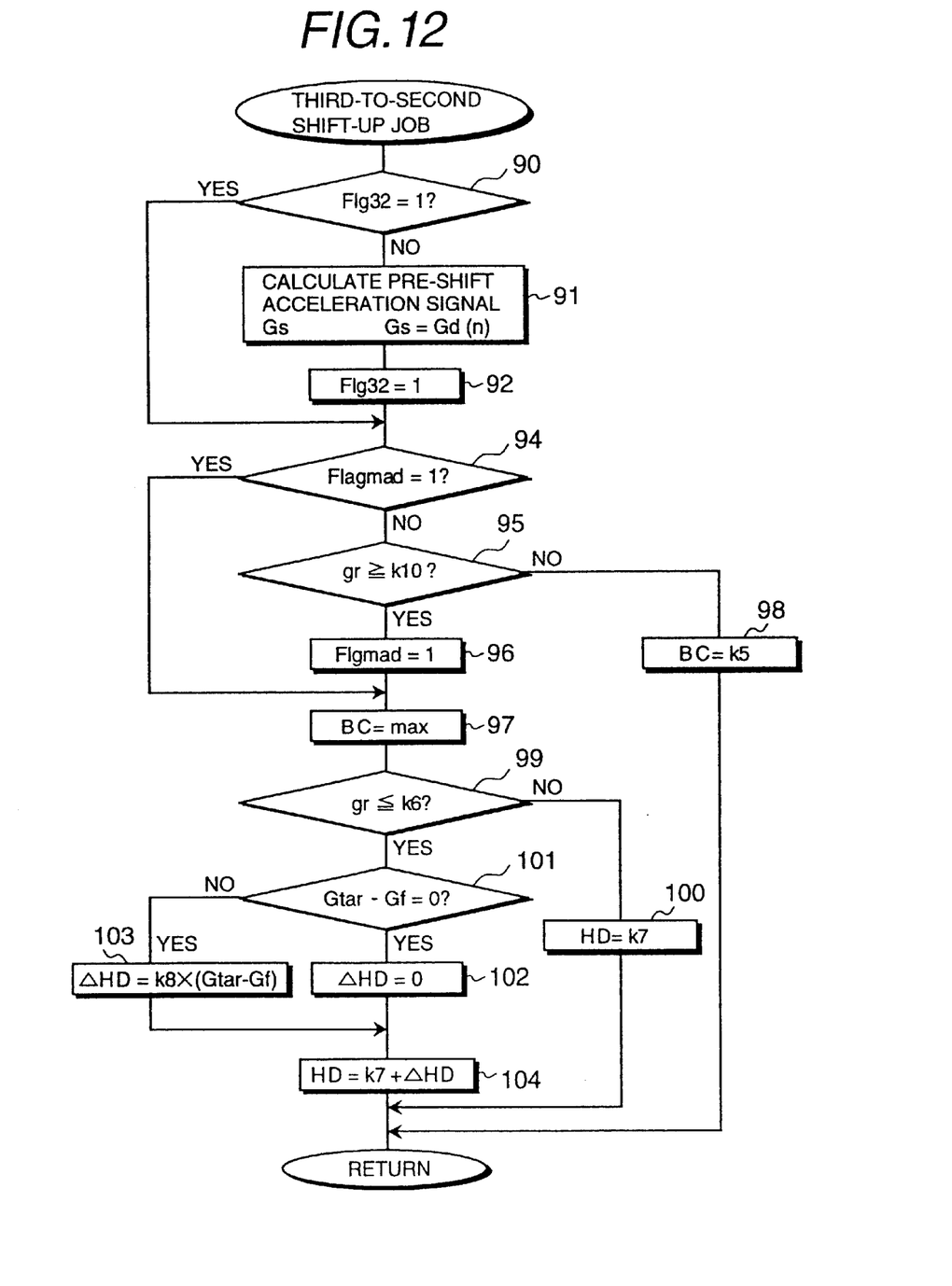
FIG. 12 is a flowchart of shift-down control of the embodiment.
Figure 13:
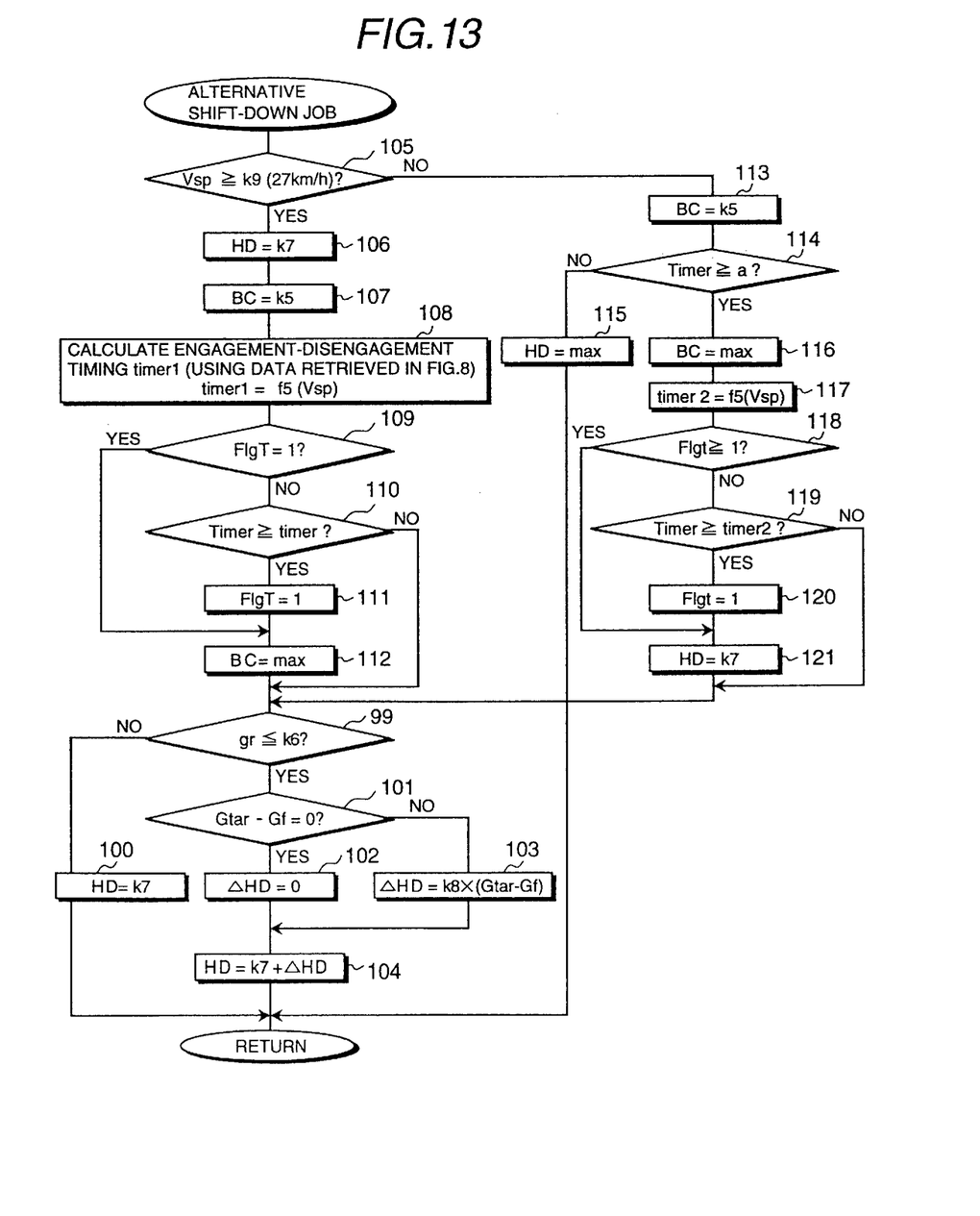
FIG. 13 is a flowchart of shift-down control of another embodiment of the invention.

FIGS. 10, 11 and 12 are flowcharts of control for the embodiment according to the invention. FIG. 10 is a main control flowchart of the embodiment. In step 60 of FIG. 10, the shift command signal Ss, throttle valve opening θ, transmission output shaft speed No, oil temperature Toil, acceleration G, and turbine speed Nt are read. In step 61, an acceleration Gf is calculated through filtering by use of a function f1 of the acceleration G. In step 62, a vehicle speed Vsp for control of the engagement and disengagement timings of the frictional engaging devices for a shift-down is calculated by use of a function f2 of the transmission output shaft speed No. In step 63, a speed ratio gr is calculated by use of the transmission output shaft speed No and turbine speed Nt. In step 64, the acceleration Gf is substituted for an acceleration Gd(n), i.e., a pre-shift acceleration signal used for shift-down control. In step 65, the shift command signal Ss is used to judge the shift type (e.g., shift-up or shift-down). If a shift-up is recognized, steps 66 and 67 are reached in which flags Flg32 and Flgmad for shift-down control are set to 0 each. In step 68, the processing of FIG. 11 is carried out. If a shift-down is recognized in step 65, steps 69 and 70 are reached in which flags Flg23 and flgmax for shift-up control are set to 0 each. In step 71, the processing of FIG. 12 is carried out. In step 72, the engaging hydraulic pressure command signal HC, disengaging hydraulic pressure command signal BB, disengaging hydraulic pressure command signal HD and engaging hydraulic pressure command signal BC acquired in the processes of FIGS. 11, 12 and 13 are output. The example cited here is related to the second-to-third shift and third-to-second shift shown in FIGS. 2 and 3. Finally, the current acceleration Gd(n) is substituted for the preceding acceleration Gd(n−1), and processing returns.

FIG. 11 is a shift-up control flowchart of the embodiment. The processing of FIG. 11 applies when the timing chart of FIG. 2 is in effect. In step 74 of FIG. 11, a check is made to see if the flag Flg23 is set to 1, the flag Flg23 being used to keep constant the acceleration Gs to be calculated in step 75. If the flag Flg23 is set to 1 in step 76, step 77 is directly reached from the next time on. In step 77, an acceleration Gshift is calculated by use of a function f3 of the throttle valve opening θ, the acceleration Gshift being used to check if a shift-up has started, i.e., if a torque phase has begun. The acceleration Gshift plots a curve going upward to the right as the throttle valve opening θ is progressively increased. In step 78, a check is made to see the flag Flgmax is set to 1, the flag Flgmax being used to skip step 79 (Gf≦Gs−Gshift?) from the next time on if the result of the check in step 79 is positive (i.e., "YES"). When the flag Flgmax is set to 1 in step 80, step 81 is reached in which the disengaging hydraulic pressure command signal BB is maximized in value to disengage the disengaging-side frictional engaging device. If the result of the check in step 79 is negative (i.e., "NO"), step 82 is reached. In step 82, a hydraulic pressure maintenance constant k1 bordering on disengagement is substituted for the value BB. In step 83, a check is made to see if the speed ratio gr is equal to or less than a constant k2. The check in step 83 is intended to verify whether part A in FIG. 2 has ended. If the result of the check in step 83 is negative ("NO"), step 84 is reached in which a hydraulic pressure command value k4 for suppressing torque fluctuations at the beginning of an inertia phase is substituted for the engaging hydraulic pressure command value HC. If the result of the check in step 83 is positive ("YES"), step 85 is reached. In step 85, a check is made to see if the difference between a target acceleration Gtar and the acceleration Gf is zero. If the result of the check in step 85 is positive ("YES"), step 86 is reached in which zero is substituted for a corrective hydraulic pressure ΔHC. If the result of the check in step 85 is negative ("NO"), step 87 is reached in which the difference between the target acceleration Gtar and the acceleration Gf is multiplied by a gain k3 to calculate the corrective hydraulic pressure ΔHC. In step 88, the corrective hydraulic pressure ΔHC is added to the constant k4. Processing then returns to step 68 of main control.

FIG. 12 is a shift-down control flowchart of the embodiment. The processing of FIG. 12 applies when the timing chart of FIG. 3 is in effect. In step 90 of FIG. 12, a check is made to see if the flag Flg32 is set to 1, the flag Flg32 being used to keep constant the acceleration Gs to be calculated in step 91. If the flag Flg32 is set to 1 in step 92, step 94 is directly reached from the next time on. In step 94, a check is made to see if the flag Flgmad is set to 1, the flag Flgmad being used to skip step 95 from the next time on if the result of the check in step 95 (gr≧k10) is positive ("YES"). If the flag Flgmad is set to 1 in step 96, step 97 is reached in which the engaging hydraulic pressure command value BC is maximized in value to engage the engaging-side frictional engaging device. If the result of the check in step 95 is negative ("NO"), step 98 is reached. In step 98, a hydraulic pressure maintenance constant k5 bordering on disengagement is input to the engaging hydraulic pressure command value BC. The value k10 used in step 95 is a speed ratio value at which the start of acceleration in the torque phase is satisfactory, as explained with reference to FIG. 3. In step 99, a check is made to see if the speed ratio gr is equal to or greater than a constant k6. The check in step 99 is intended to verify whether part B in FIG. 3 has ended. If the result of the check in step 99 is negative ("NO"), step 100 is reached. In step 100, a hydraulic pressure command value k7 for suppressing torque fluctuations (i.e., sudden drop of torque) in the inertia phase is substituted for the disengaging hydraulic pressure command value HD. If the result of the check in step 99 is positive ("YES"), step 101 is reached in which a check is made to see if the difference between the target acceleration Gtar and the acceleration Gf is zero. If the result of the check in step 101 is positive ("YES"), step 102 is reached in which zero is substituted for the corrective hydraulic pressure ΔHD. If the result of the check in step 101 is negative ("NO"), step 103 is reached. In step 103, the difference between the target acceleration Gtar and the acceleration Gf is multiplied by a gain k8 to calculate the corrective hydraulic pressure ΔHD. In step 104, the corrective hydraulic pressure ΔHD is added to the constant k7 used in step 100. Processing then returns to step 71 of main control.

FIG. 13 is a shift-down control flowchart of another embodiment of the invention. In step 105 of FIG. 13, a check is made to see if the vehicle speed vsp is equal to or higher than a vehicle speed k9 at point zero in time shown in FIG. 8. The check in step 105 involves verifying whether the vehicle speed k9 is in excess of about 27 km/h. If the result of the check in step 105 is positive ("YES"), case c in FIG. 7 applies and step 106 is reached accordingly. In step 106, the constant k7 is substituted for the disengaging hydraulic pressure command value HD. In step 107, the constant k5 is substituted for the engaging hydraulic pressure command value BC. These constants are the same as those shown in FIG. 12. In step 108, an engagement-disengagement time timer1 for the vehicle speed Vsp indicated in FIG. 8 is calculated by use of a function f5 of the vehicle speed Vsp. In step 109, a check is made to see if a flag FlgT is set to 1, the flag FlgT being used to skip step 110 (Timer≧timer1?) from the next time on. If the flag FlgT is found to be 1 in step 109, step 112 is reached in which a constant max is substituted for the engaging hydraulic pressure command value BC. If the result of the check in step 110 is negative ("NO"), step 99 is reached. Steps 99 through 104 are the same as those in FIG. 12. If the result of the check in step 105 is negative ("NO"), case b in FIG. 7 applies and step 113 is reached accordingly. In step 113, the constant k5 is substituted for the engaging hydraulic pressure command value BC. In step 114, a check is made to see if the time on the timer 52 shown in FIG. 9 has elapsed by the period a indicated in FIG. 7. If the result of the check in step 114 is negative ("NO"), step 115 is reached and processing returns. If the result of the check in step 114 is positive ("YES"), step 116 is reached in which the constant max is substituted for the command value BC to engage the frictional engaging device. In step 117, an engagement-disengagement time timer2 for the vehicle speed Vsp indicated in FIG. 8 is calculated by use of the function f5 of the vehicle speed Vsp. In step 118, a check is made to see if a flag Flgt is set to 1, the flag Flgt being used to skip step 119 (Timer≧timer2?) from the next time on. If the flag Flgt is found to be 1 in step 118, step 121 is reached in which the constant k7 is substituted for the command value HD. If the result of the check in step 119 is negative ("NO"), step 99 is reached.

As described, the present invention as embodied above suppresses torque fluctuations that can occur during a shift of the automatic transmission in which the clutch is engaged and disengaged for shift control, whereby robustness is enhanced and shift characteristics are improved. The invention also deals effectively with torque fluctuations increased by oil temperature changes or over time, so that satisfactory shift characteristics are acquired in a repeatable manner.

As many apparently different embodiments of this invention may be made without departing from the spirit and scope thereof, it is to be understood that the invention is not limited to the specific embodiments thereof except as defined in the appended claims.

What is claimed is:

1. A control apparatus for an automatic transmissions, comprising a plurality of frictional engaging devices incorporated in an automatic transmission which reduces an engine output in a vehicle, transmits the reduced engine output to driving wheels of said vehicle, and varies a speed ratio representing the ratio of the reduction of the engine output, said plurality of frictional engaging devices being configured to be frictionally engaged and disengaged to turn on and off the transmission of the reduced engine output, at least one of said plurality of frictional engaging devices being configured to be frictionally engaged and at least one of the remaining frictional engaging devices being configured to be disengaged to execute a shift to vary said speed ratio, pressure control command generation apparatus arranged to control hydraulic pressures supplied to the frictional engaging devices to effect an engagement and a disengagement of the devices at the time of said shift and to vary characteristics of hydraulic pressure control longitudinal acceleration detection apparatus for detecting a longitudinal acceleration of said vehicle prior to said shift;

acceleration signal change state calculation apparatus for calculating a changing value of said longitudinal acceleration prior to said shift; and stepped signal calculation apparatus for calculating a stepped signal for causing said pressure control command generation apparatus to disengage the engaged frictional engaging device in accordance with the calculated changing value of said longitudinal acceleration.

2. A control apparatus for an automatic transmission according to claim 1, wherein said stepped signal calculated by said stepped signal calculation apparatus is a signal changed within 200 msec of a target value.

3. A control apparatus for an automatic transmission according to claim 1, wherein said stepped signal calculated by said stepped signal calculation apparatus is a signal for disengaging the engaged frictional engaging device near a beginning of an inertia phase in which the speed of said engine varies during said shift.

4. A control method for an automatic transmission having a plurality of frictional engaging devices incorporated in an automatic transmission which reduces an engine output in a vehicle, transmits the reduced engine output to driving wheels of said vehicle, and varies a speed ratio representing the ratio of the reduction of the engine output, said plurality of frictional engaging devices being frictionally engaged and disengaged to turn on and off the transmission of the reduced engine output, at least one of said plurality of frictional engaging devices being frictionally engaged and at least one of the remaining frictional engaging devices being disengaged to execute a shift to vary said speed ratio, and pressure control command generation apparatus controlling hydraulic pressures supplied to the frictional engaging devices to effect an engagement and a disengagement of the devices at the time of said shift and varying characteristics of hydraulic pressure control, comprising the steps of:

detecting a longitudinal acceleration of said vehicle prior to said shift;

calculating a changing value of said longitudinal acceleration prior to said shift; and calculating a stepped signal for disengaging the engaged frictional engaging device in accordance with the calculated changing value of said longitudinal acceleration.

* * * * *